US008443372B2

(12) United States Patent
Callaway et al.

(10) Patent No.: US 8,443,372 B2
(45) Date of Patent: May 14, 2013

(54) METHODS AND SYSTEMS FOR PARTITIONING DATA IN PARALLEL PROCESSING SYSTEMS

(75) Inventors: Paul J. Callaway, Chicago, IL (US); Sunil Kiran Cutinho, Park Ridge, IL (US); Paul M. Dantzig, Scarsdale, NY (US); Stephen M. Goldman, Lake Forest, IL (US); Arun Kwangil Iyengar, Yorktown Heights, NY (US); Francis Nicholas Parr, New York, NY (US); Agnes Shanthi Thiruthuvadoss, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 984 days.

(21) Appl. No.: 11/388,159

(22) Filed: Mar. 23, 2006

(65) Prior Publication Data
US 2007/0226744 A1    Sep. 27, 2007

(51) Int. Cl.
*G06F 9/46* (2006.01)
*G06Q 30/00* (2012.01)

(52) U.S. Cl.
USPC .................... 718/105; 705/14.17; 705/335

(58) Field of Classification Search ........... 718/105, 718/100, 104; 705/8
See application file for complete search history.

(56) References Cited

U.S. PATENT DOCUMENTS

| 5,864,679 | A  | * | 1/1999  | Kanai et al. ............... 709/238 |
| 5,987,468 | A  | * | 11/1999 | Singh et al. ............... 707/100 |
| 6,041,307 | A  | * | 3/2000  | Ahuja et al. ............... 705/8 |
| 6,175,869 | B1 | * | 1/2001  | Ahuja et al. ............... 709/226 |
| 6,314,465 | B1 | * | 11/2001 | Paul et al. ............... 709/226 |
| 6,370,560 | B1 | * | 4/2002  | Robertazzi et al. ......... 718/105 |
| 6,377,991 | B1 | * | 4/2002  | Smith et al. ............... 709/226 |
| 6,381,594 | B1 | * | 4/2002  | Eichstaedt et al. .......... 707/3 |
| 6,480,561 | B1 | * | 11/2002 | Proksa ............... 378/16 |
| 6,480,861 | B1 | * | 11/2002 | Kanevsky et al. ......... 707/103 Y |
| 6,978,253 | B2 | * | 12/2005 | Lin ............... 705/26 |
| 7,017,110 | B1 | * | 3/2006  | Chi et al. ............... 715/205 |
| 7,120,912 | B2 | * | 10/2006 | Kadoiri et al. ............. 718/104 |
| 7,130,824 | B1 | * | 10/2006 | Amanat et al. ........... 705/37 |
| 7,356,581 | B2 | * | 4/2008  | Hashimoto ............ 709/224 |
| 7,853,523 | B2 | * | 12/2010 | Krueger et al. .......... 705/39 |
| 2004/0073639 | A1 | * | 4/2004 | Basoglu et al. ........... 709/223 |
| 2004/0216114 | A1 | * | 10/2004 | Lin ............... 718/105 |
| 2005/0172013 | A1 | * | 8/2005 | Tan et al. ............... 709/220 |
| 2005/0198106 | A1 | * | 9/2005 | Lamport ............... 709/201 |

OTHER PUBLICATIONS

D.M. Dias et al., "A Scalable and Highly Available Web Server," Proceedings of COMPCON '96, 8 pages, 1996.
V.S. Pai et al., "Locality-Aware Request Distribution in Cluster-Based Network Services," Proceedings of ASPLOS VIII, pp. 1-12, Oct. 1998.

* cited by examiner

*Primary Examiner* — Camquy Truong
(74) *Attorney, Agent, or Firm* — Preston J. Young; Ryan, Mason & Lewis, LLP

(57) ABSTRACT

Techniques are disclosed for processing requests in a data processing system. While the principles of the invention are not limited to a particular domain, they are particularly suitable for use in an electronic trading system. By way of example of one aspect of the invention, a method for directing requests to at least one node in a system comprising multiple nodes and a plurality of requests comprises associating a number to each request, assigning at least one number to each node so as to balance a load across the nodes, and sending a request to a node based on the number associated to the request. Various other aspects are disclosed.

12 Claims, 11 Drawing Sheets

METHODS AND SYSTEMS FOR PARTITIONING DATA IN PARALLEL PROCESSING SYSTEMS

FIELD OF THE INVENTION

The present invention generally relates to data processing systems and, more particularly, to techniques for partitioning data in a parallel processing environment.

BACKGROUND OF THE INVENTION

Market matching is a core component needed to manage trading in a set of financial instruments. A market matching service typically maintains a set of order books. In an electronic trading system, such order books are electronically maintained. Different order books may be maintained for different financial instruments traded. The order books may be used for processing arriving orders to buy and sell those instruments.

Requests arriving at the market matching service may be a mixture of new orders, cancellations and modifications of previous orders, etc. By way of example, a simple order may be a request to buy or sell a specific quantity of a specific instrument on behalf of a specific customer at a named price or limit price. Refinements such as mass-quote, stop loss and all-or-nothing orders require additional features, but do not change the basic pattern of processing.

One problem known to exist in a conventional electronic trading system, which implements a market matching service, is the ability of the system to efficiently process a high volume of requests.

Accordingly, there is a need for techniques that are able to efficiently process a high volume of requests in a data processing system such as in an electronic trading system.

SUMMARY OF THE INVENTION

Principles of the invention provide techniques for processing requests in a data processing system. While the principles of the invention are not limited to a particular domain, they are particularly suitable for use in an electronic trading system.

In a first aspect of the invention, a method for directing requests to at least one node in a system comprising multiple nodes and a plurality of requests comprises associating a number to each request, assigning at least one number to each node so as to balance a load across the nodes, and sending a request to a node based on the number associated to the request.

In a second aspect of the invention, a method for storing information across nodes in a system comprising multiple nodes comprises assigning different prices to different parts of the information, and storing the information across the nodes based on the prices.

In a third aspect of the invention, a method for balancing load across nodes in a system comprising multiple nodes comprises storing multiple data objects among the plurality of nodes, and in response to a node becoming overloaded, migrating at least one data object from the overloaded node to a second node.

In a fourth aspect of the invention, a method for balancing load across nodes in a system comprising multiple nodes and multiple data objects comprises maintaining an estimate of load associated with each data object, and using the estimates of load associated with each data object to store the data objects among the plurality of nodes so as to balance load among the nodes.

Advantageously, as will be described herein in the context of various embodiments, illustrative principles of the invention are applicable to parallel processing in electronic trading systems as well as other domains. For example, methods and systems are provided for partitioning data objects or structures such as order books across multiple processors. By way of further example, load balancing techniques applicable to a broad range of parallel systems are also provided.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
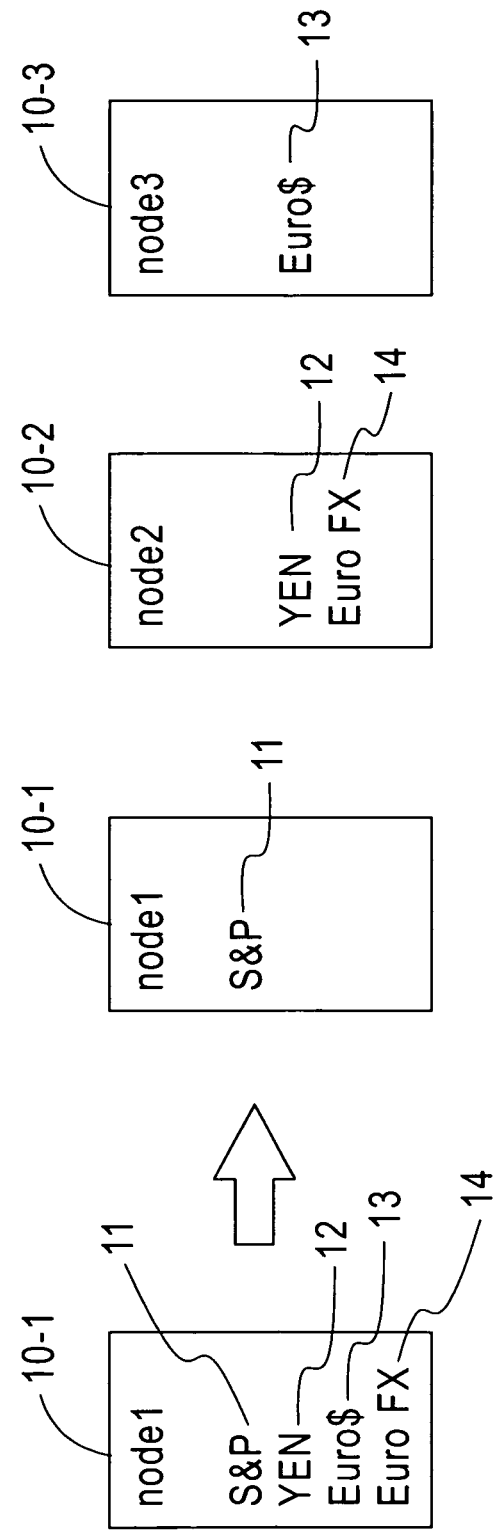
FIG. 1 is a block diagram illustrating how multiple order books can be distributed across multiple nodes, in accordance with an embodiment of the present invention.

Illustrative principles of the invention will be explained below in the context of a distributed electronic trading system, wherein customers make trading requests to the system and the system processes the requests. However, it is to be understood that the present invention is not limited to such an implementation. Rather, the invention is more generally applicable to any request-based data processing environment in which it would be desirable to provide improved request processing performance.

Furthermore, data that is to be maintained and processed, such as an order book, may be referred to generally herein as an "object" or a "data object" or a "data structure." Thus, while the illustrative embodiment is explained in terms of order books, a data object or structure may take on any form. Accordingly, it is to be understood that the invention is not limited to any particular form of data object or structure.

Before explaining an illustrative information partitioning methodology and system architecture for implementing principles of the invention, an illustrative description of a market matching service or function, and processing associated therewith, is provided in accordance with an embodiment of the invention.

Within the market matching function, arriving orders (requests) may be added sequentially into an order book for a financial instrument to which it refers. A market matching engine (i.e., a data processing component of an electronic trading system) should then identify and execute one or more orders which can be traded immediately. The engine does this by matching a newly arrived order with other matching orders already in the book for that instrument. Orders to sell are matched with orders to buy for the same instrument at the same price and conversely.

Published business rules govern how this matching of orders is to be done. For example, orders might have to be processed fairly and in the sequence in which they are received. Orders might always have to be satisfied at the best matching price available and for as much of the quantity specified in the arriving order as is possible at that price and time. If there is a choice of matching orders at the best price, published allocation rules may govern which matching orders will be selected for trading.

A market matching function may also be responsible for generating acknowledgements when it has processed an order, reporting on successfully applying an order to the market book and on trades executed involving that order. A gateway function is to return these acknowledgements to the customer. The market matching function may also be responsible for generating and distributing market information describing the current market liquidity and recently executed trades anonymously.

Customers may interact with a market matching function of an exchange through sessions with a set of gateways—we also use the term gateway processing nodes. The gateways may handle the communication and client session processing for an individual client's electronic connection to the exchange. One client may be interacting with multiple trading products in an exchange and with multiple order books within each trading product. The gateway processing may be responsible for forwarding orders from customers to an appropriate market matching function and getting acknowledgements from the market matching delivered back to the customer.

Since reliability may be a critical requirement on the market matching function, market matching processing may be organized so as to have secondary market matching capability prepared and ready to take over processing responsibility from primary market matching capability in the event of a market matching engine failure.

An electronic market matching engine may operate in a continuous loop executing a sequence of logical steps for received requests similar to the following:

Buy and sell orders are received for parsing, matching, and sequencing (they may have already been assigned conversation sequence numbers to ensure that the messages for each customer conversation are handled in the correct order, but now primary node sequencing numbers are added to fix the ordering between requests from different customers and to enable standby and failover processing by a secondary).

Order cancellations and modifies are applied to orders in the book.

New orders are placed in the book and logged to ensure recovery over a system failure.

The matching engine determines whether a newly arrived or modified order is tradable immediately because there are previous opposing orders in the book matching it.

An allocation algorithm is run to determine the exact orders to trade following precisely defined business rules.

All successfully completed and logged actions including order placement, and completed trades are acknowledged back to the trading or requesting customers via gate processing. Anonymized reports on executed trades and market liquidity are also published as market data.

Logged orders and trades are streamed into a database where they may be available to surveillance queries by, for example, control center staff.

In addition, a market matching function may provide operator facilities to start, stop, pause and monitor markets (sets of books). It may also provide facilities to allow operators to locate books within the matching engine, orders of a particular customer, etc., and process them individually, or make manual corrections.

In accordance with an illustrative embodiment of the invention, we now describe a scalable architecture for market matching which can handle high transaction rates. As will be evident, the architecture makes use of distributed memory clustering.

The architecture is designed to be both scalable and highly available. Higher numbers of processors can result in greater availability and greater resilience to failure. The architecture is comprised of a plurality of nodes, where a node may be (but is not necessarily limited to) a single processor or a symmetric memory multiprocessor (SMP). The nodes may be clustered at a single site. Alternatively, for higher availability, multiple clusters at distinct geographic locations could exist.

We will refer to our architecture as a highly available adaptive partitioning (HA-APART) architecture. The data distribution capabilities that HA-APART possesses can be used to distribute a "hot" order book among several nodes. It is to be understood that a "hot" order book is one that receives a high level of activity (e.g., a high volume of requests relating to that book). If one node wants to access a data object or structure stored on another node, the first node may request the data from the second node.

One of the key difficulties in parallelizing electronic market matching is how to partition the application across multiple processing nodes (referred to herein as "nodes").

One approach is not to split a single order book across different nodes. This approach is illustrated in FIG. 1. As shown, on the left hand side of the arrow, node 1 (10-1) maintains order books 11 (S&P), 12 (YEN), 13 (Euro$) and 14 (EuroFX). On the right hand side of the arrow, the order books have been partitioned across multiple nodes (10-1, 10-2 and 10-3). Note that each order book remains as a whole on a given node.

Figure 2:
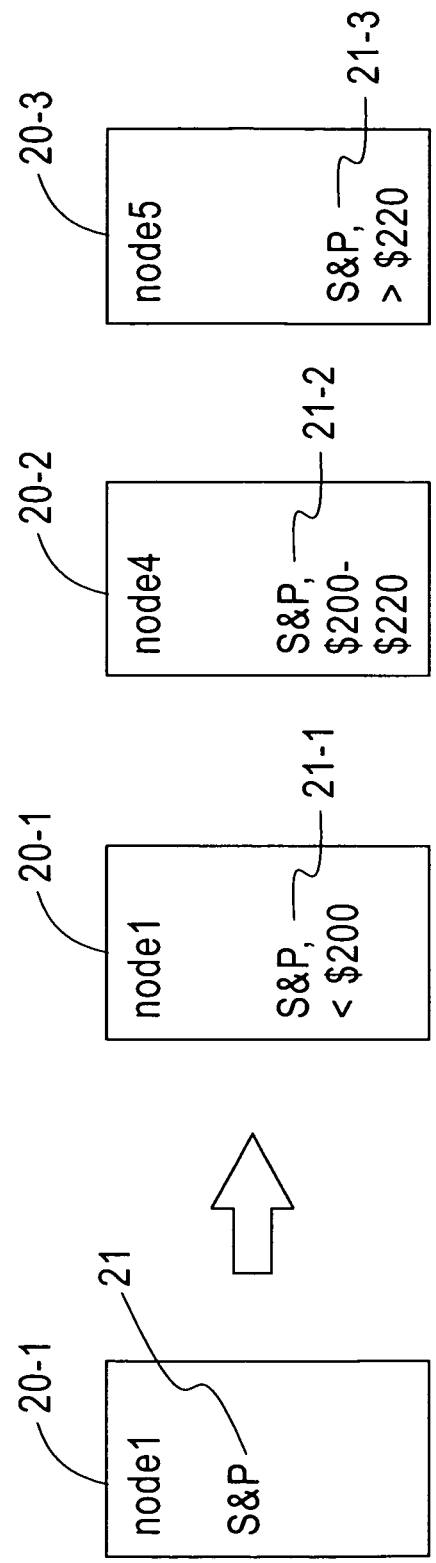
FIG. 2 is a block diagram illustrating how a single order book can be partitioned across multiple nodes, in accordance with an embodiment of the present invention.

However, if a single order book becomes very hot, however, it may become necessary to partition the order book across more than one node. This approach is illustrated in FIG. 2. Order books may be assigned to nodes in order to balance load among the nodes. As load on the system changes, it may be desirable to move order book data between nodes to dynamically balance load. The HA-APART architecture has the ability to dynamically move data (e.g., order books) from one node to another. One key reason for doing this would be for load balancing. Another reason would be to add and/or remove a node.

We now describe a method for partitioning hot order books. A single order book may receive such a high level of activity that it needs to be partitioned among multiple nodes. This is referred to as a hot order book. When this is done, different tick ranges will be assigned to different nodes. This process is illustrated in FIG. 2.

As shown, on the left hand side of the arrow, order book (S&P) 21 is maintained on node 20-1. On the right hand side of the arrow (after partitioning), node 1 handles orders (from order book 21) less than $200. Node 4 handles orders (from order book 21) between $200 and $220. Node 5 handles orders (from order book 21) above $220. For example, a request to buy shares at $199 per share would be handled by node 1. A request to sell shares at $225 per share would be handled by node 5.

Partitioning is preferably done in a manner which balances load evenly among different nodes. The scenario depicted in FIG. 2 corresponds to a situation in which the trading price of the financial instrument is close to $210. The vast majority of orders are clustered close to $210. Therefore, even though the price range handled by node 4 is considerably smaller than the price ranges handled by node 1 and node 5, node 4 is still likely to receive a large number of orders.

Figure 3:
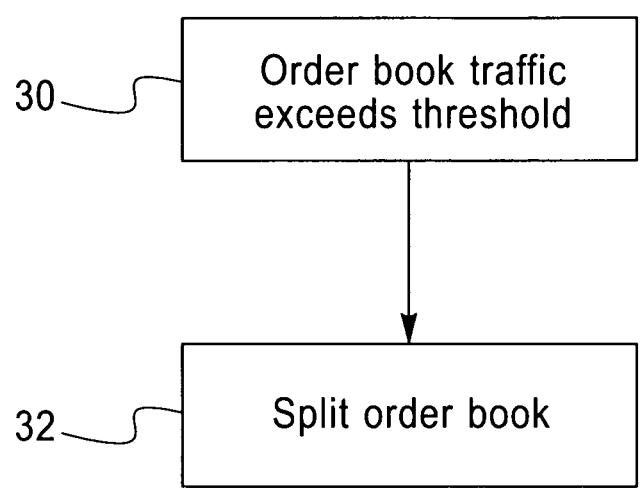
FIG. 3 is a flow diagram illustrating a method for partitioning an order book across multiple nodes, in accordance with an embodiment of the present invention.

FIG. 3 depicts a flow diagram for splitting a hot order book. Statistics may be maintained regarding the frequency of orders received by an order book and/or the load on a node corresponding to an order book. Once the order book traffic and/or load on the node exceeds a threshold (step 30), the system may decide to split an order book across multiple nodes (step 32). This will enable more processing resources to be devoted to the order book which should mean that the system can handle a higher transaction rate for the order book.

It is to be understood that the "system" referred to here is the electronic trading system to which the processing nodes belong. Thus, it is to be understood that the steps of maintaining statistics regarding order frequency and node load, checking whether order book traffic exceeds a threshold value, and splitting of an order book, are steps that are automatically or semi-automatically performed by a computing system associated with the electronic trading system. Thus, such a computing system (illustratively described below in the context of FIG. 9) is in communication with the various nodes such that a decision to split an order book can be effectuated.

Note that the steps in FIG. 3 can be applied to further split an order book which is already partitioned across multiple nodes into additional partitions spread across additional nodes.

Figure 4:
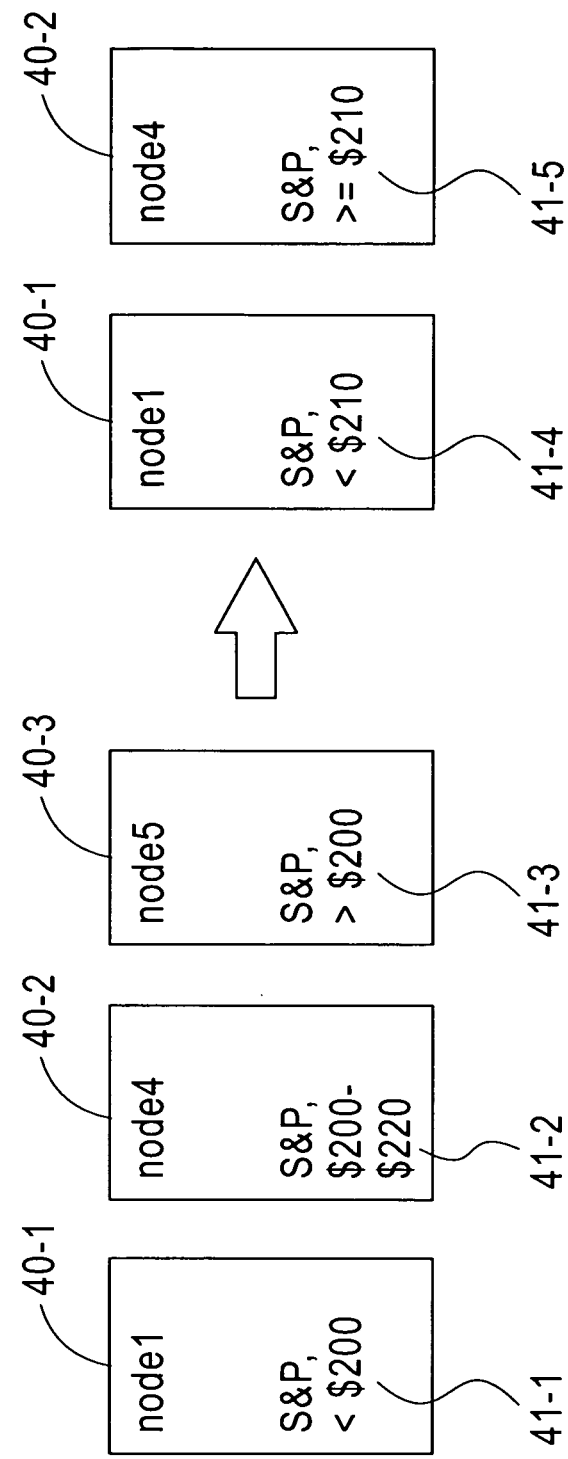
FIG. 4 is a block diagram illustrating how multiple order book partitions can be merged, in accordance with an embodiment of the present invention.

It may also be desirable to merge partitions in order to reduce the number of nodes handling an order book. This could be done if the request traffic to a hot order book drops to a level where it no longer needs as many nodes. It can also be used to free up a node for other tasks. FIG. 4 presents an example of merging partitions (41-1, 41-2, 41-3 merged to 41-4, 41-5) in order to reduce the number of nodes handling the order book for the S&P from three (40-1, 40-2, 40-3) to two (40-1, 40-2). Thus as shown, after the merge, node 5 is no longer handling S&P commodity trading and can be used for other purposes.

Figure 5:
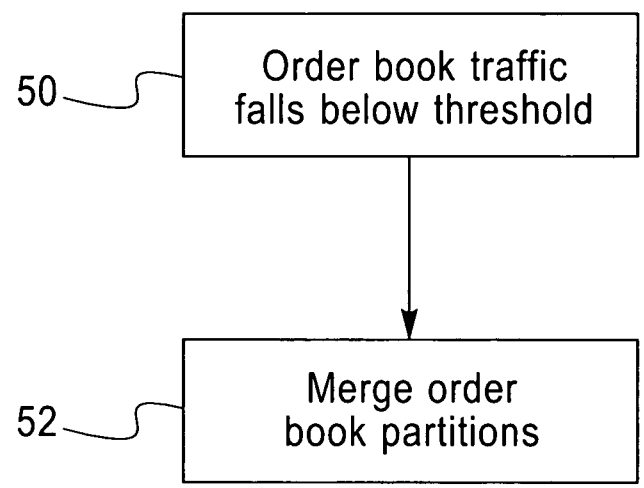
FIG. 5 is a flow diagram illustrating a method for merging a plurality of order book partitions, in accordance with an embodiment of the present invention.

FIG. 5 depicts a flow diagram for merging partitions corresponding to an order book. Again, statistics may be maintained regarding the frequency of orders received by an order book partition and/or the load on a node corresponding to an order book partition. Once the order book traffic and/or load on one or more nodes handling an order book partition falls below a threshold (step 50), the system may decide to merge partitions (step 52) so that the order book uses fewer nodes. This will free up nodes for other purposes. Alternatively, it is to be appreciated that the triggering event for merger may be that computing resources are needed for another task.

Note that if an order book is partitioned across n nodes, the steps in FIG. 5 can be applied to merge partitions so that the order book uses anywhere between one and n−1 nodes.

In order to balance load across multiple nodes, order books (either a whole order book or a partition) can be migrated from one node to another. We now describe an illustrative method for load balancing by migrating data.

Order book data is partitioned across different nodes. Transactions directed to a particular partition p1 on node n1 generally increase the load on n1. In order to decrease the load that n1 receives, p1 may be moved to another node n2. If so, then n2 will subsequently receive requests corresponding to p1, not n1. This should free up processing power on node n1.

When a node n1 becomes overloaded, the system may pick an underutilized node, n2, to which to transfer load. Order book data is then transferred from n1 to n2. The system may monitor the load on different nodes to estimate load levels and make decisions on how to migrate data. It may also maintain load statistics H for different order book partitions to make load balancing decisions.

Load statistics H may be maintained for a partition p1. Note that a partition may be interpreted as encompassing a part of an order book or a whole order book. These load statistics are correlated with how much load (e.g., CPU processing overhead and/or possibly other resources such as I/O, storage, network bandwidth) p1 adds to a node. If it is assumed that this load is directly related to the number of transactions corresponding to p1, then H may be determined by the rate of transactions directed to p1. This transaction rate may constantly be changing. If so, it is preferable to weight more recent transactions more heavily than less recent transactions in determining H.

Figure 6:
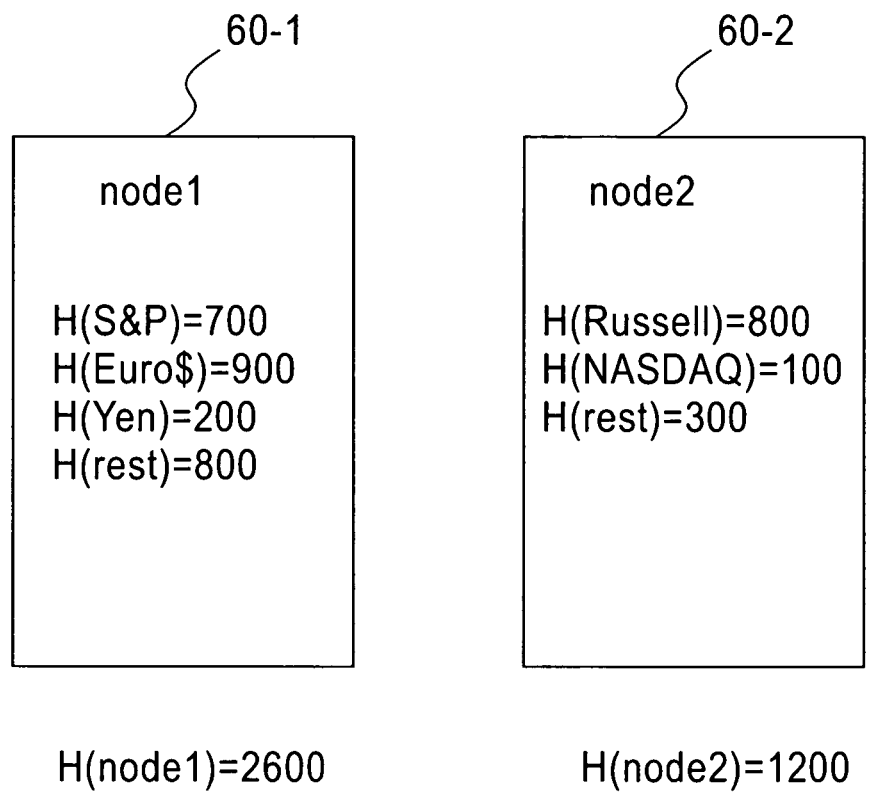
FIG. 6 is a block diagram illustrating an assignment of load statistics to order books, in accordance with an embodiment of the present invention.

FIG. 6 illustrates the use of load statistics H for performing load balancing. In this example, node 1 (60-1) is overloaded relative to node 2 (60-2). The H values are correlated with transaction rates received by different order books as well as with the load incurred by the node storing the order book. The H value for "Euro$" indicates a much higher transaction rate than that for "Yen" (900 versus 200). The system may make the decision to migrate "S&P" from node 1 to node 2. If the entire S&P order book is moved from node 1 to node 2, then the H value of node 1 (2600−700=1900) will equal the H value of node 2 (1200+700=1900). Thus, after this is done, resources on node1 will be freed up, and node1 and node2 will have comparable loads.

Note that load statistics H can be maintained for an entire node, an entire order book, or partitions of order books, such as the partitions shown in FIGS. 1 and 2. For a given order book, H values can be maintained for different price ranges. For example, different H values can be maintained for transactions in the range of $160-$180, $181-$200, $201-$210, etc. These H values can be used to determine how to partition order books as depicted in FIGS. 3 and 5.

There are several methods for determining H values. One method is to simply count a number of transactions received over a certain time period. Variations of this method which weight more recent accesses more highly than less recent accesses are also possible. A wide variety of other methods for computing H are possible within the spirit and scope of the invention.

Figure 7:
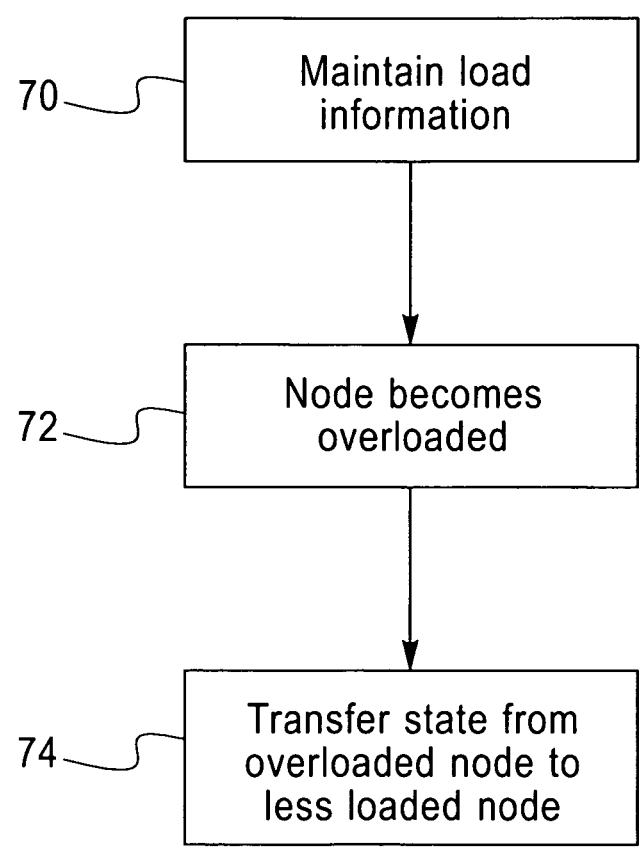
FIG. 7 is a flow diagram illustrating a method for balancing load by transferring data, in accordance with an embodiment of the present invention.

FIG. 7 depicts a flow diagram illustrating a method for balancing load in accordance with an embodiment of the invention. In step 70, load information is maintained. This step typically is continuously executed. There are a number of ways to maintain load information. For example, load statistics H may be maintained for data objects or structures which are stored on a node. One method of estimating load on a node is via H values. For example, the estimated load on a node might be the sum of the H values of data structures residing on the node.

There are other methods of estimating load as well. For example, CPU or other resources (e.g., I/O resources, storage, and network bandwidth) could be monitored to estimate load.

The first time step 70 is invoked (for example, when the system is first started up), estimates of past H values may be used to perform an initial load balancing in which the sum of H values for data stored on the same node are roughly equivalent across different nodes.

In step 72, the system determines that a node n1 has become overloaded.

In step 74, data is transferred from n1 to one or more less loaded nodes to reduce the overload on node n1. If H values are being maintained, then the H values can be used to determine how much data to transfer, just as in the example previously given corresponding to FIG. 6.

The methodology depicted in FIG. 7 can easily be generalized to transfer load from multiple nodes using a single application of steps 72 and 74.

Although the detailed description of preferred embodiments so far has been presented within the context of a trading system for electronic marketplaces, the techniques are applicable to load balancing across a wide variety of other domains. The method for load balancing depicted in FIG. 7 can be applied to a broad range of parallel applications including ones not having anything to do with electronic marketplaces. The assignment of H values is also applicable to a broad range of data structures in addition to order books. In situations where other data structures are used, H values may be correlated with how frequently the data structures are accessed. The techniques disclosed for partitioning order books can be applied to other data structures in other domains as well.

We now describe another method for partitioning by price levels.

Figure 8:
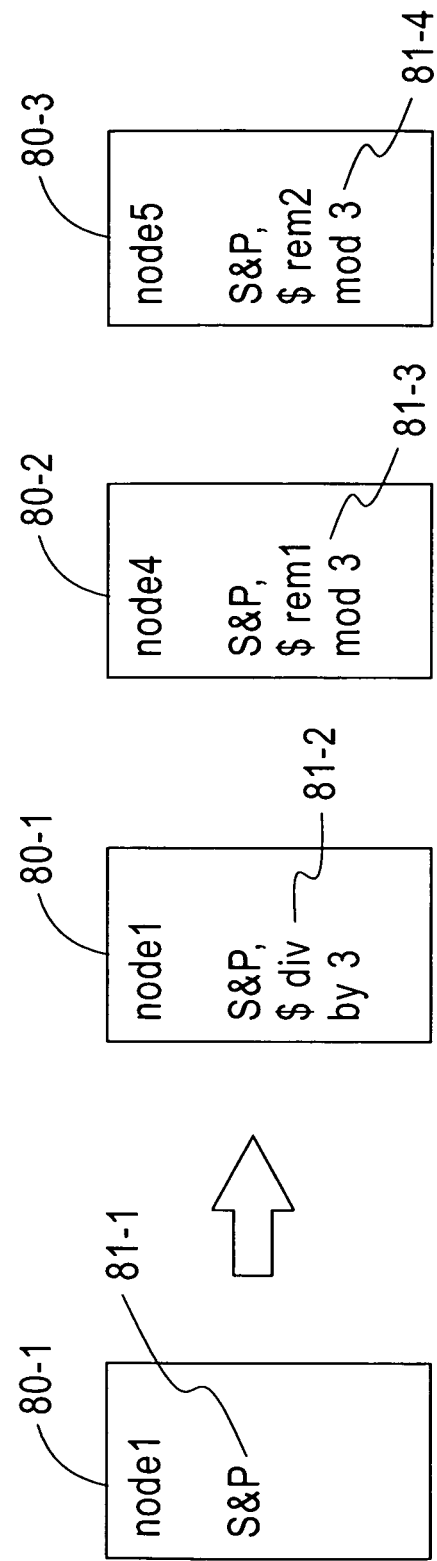
FIG. 8 is a block diagram illustrating a method for partitioning a single order book across multiple nodes in which individual price levels are assigned to different nodes, in accordance with an embodiment of the present invention.

FIG. 8 illustrates shows a method for partitioning the orders (81-2, 81-3, 81-4) of a single book (81-1) which is an alternate to the partitioning by price range illustrated in FIG. 2. In this approach, individual price levels are assigned to nodes using a function. We show, as an example, the case where all orders whose price level in dollars is exactly divisible by 3 (such orders being denoted as 81-2) are assigned to node 1 (80-1), all orders whose price level in dollars is congruent to 1 modulo 3 (such orders being denoted as 81-3) are assigned to node 4 (80-2), and all orders whose price level in dollars is congruent to 2 modulo 3 (such orders being denoted as 81-4) are assigned to node 5 (80-3). This method is clearly extensible to work with varying numbers of nodes and alternative hashing or other functions on the price level of orders.

A benefit of this partitioning method relative to the method in FIG. 2 is that, since the highest price resting order to buy on a book is often one tick value below the lowest price resting order to sell, active trading is likely to be occurring at two adjacent tick levels. With a price level partitioning as described here, this is likely to lead to at least two nodes being involved in active trading. The third node in the example here will be active in accepting orders outside the active trading range and will also become involved in active trading as soon as there is a price movement to a value adjacent to the current trading prices.

However, relative to the range based partitioning illustrated in FIG. 2, partitioning as per FIG. 8 will result in more frequent transfers of active trading responsibility between nodes causing more frequent cross-node synchronizations of order processing. In situations where cross-node synchronization can be done efficiently and good load balancing across multiple nodes is required, this partitioning method may be preferable.

Figure 9:
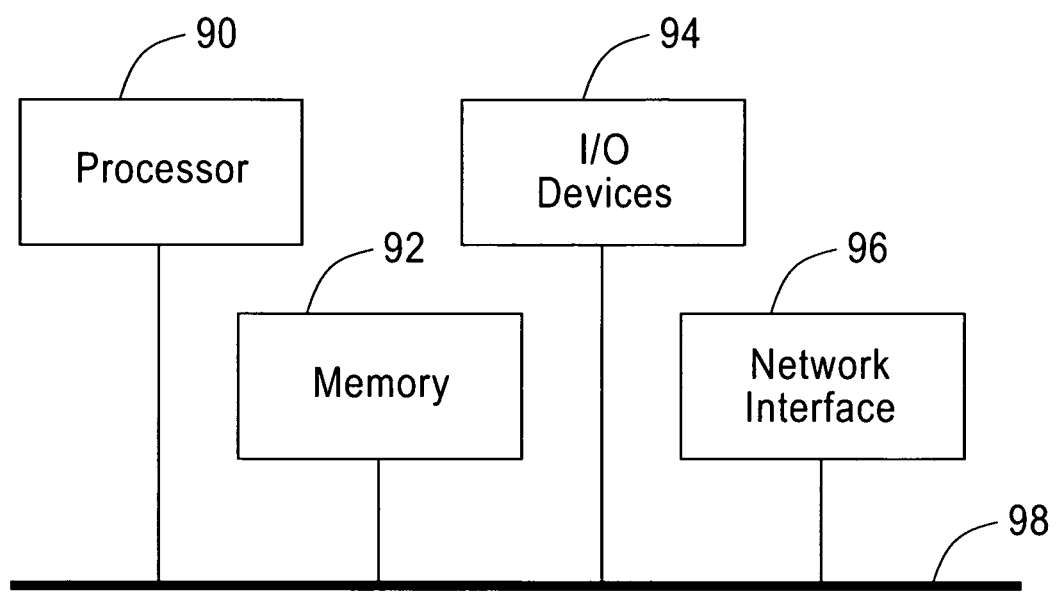
FIG. 9 is a diagram illustrating a computing system in accordance with which one or more components/steps of an electronic trading system may be implemented, according to an embodiment of the present invention.

Referring to FIG. 9, a computing system is illustrated in accordance with which one or more components/steps of an electronic trading system (e.g., components and methodologies described in the context of FIGS. 1 through 8 above, and FIGS. 10 and 11 below) may be implemented, according to an embodiment of the present invention. It is to be understood that the individual components/steps may be implemented on one such computer system, or more preferably, on more than one such computer system. In the case of an implementation on a distributed computing system, the individual computer systems and/or devices may be connected via a suitable network, e.g., the Internet or World Wide Web. However, the system may be realized via private or local networks. The invention is not limited to any particular network.

Thus, the computing system shown in FIG. 9 may represent an illustrative architecture for a computing system associated with an electronic trading system. For example, the computing system in FIG. 9 may be the computing system that performs the steps illustrated in the context of FIGS. 3, 5 and 7 (as well as any applicable steps discussed in the context of FIGS. 1, 2, 4, 6, 8 and 10). Also, the computing system in FIG. 9 may represent the computing architecture for each of the nodes upon which order books (and partitions thereof) are maintained.

As shown, the computing system may be implemented in accordance with a processor 90, a memory 92, I/O devices 94, and a network interface 96, coupled via a computer bus 98 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., speaker, display, etc.) for presenting results associated with the processing unit.

Still further, the phrase "network interface" as used herein is intended to include, for example, one or more transceivers to permit the computing system of FIG. 9 to communicate with another computing system (e.g., a node of the electronic trading system) via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Note that the above techniques can be generalized to a wide variety of cases in which an electronic system is used to sell items and customers are placing bids at different values. In accordance with principles of the invention, an electronic sales system may be scaled to run on multiple nodes. Different nodes handle different price values. In some cases, an entire range of prices may be assigned to a single node. Requests are then directed to different nodes based on a price associated with a request.

The prices assigned to different nodes may be selected to evenly distribute load across the nodes.

As another example, data may be associated with different prices. The data can be distributed across multiple nodes of a system based on price. While embodiments described above use examples of order book data, other kinds of information may also be distributed across multiple nodes.

As yet another example, a computer system might have multiple nodes. Numbers may be assigned to nodes of the system. In some cases, an entire range of numbers may be assigned to a node. Requests and/or tasks also have numbers associated with them. An individual request or task is assigned to an appropriate node based on the number of the request or task. In some cases, the request or task may cause data to be stored on the correct node based on the number.

Figure 10:
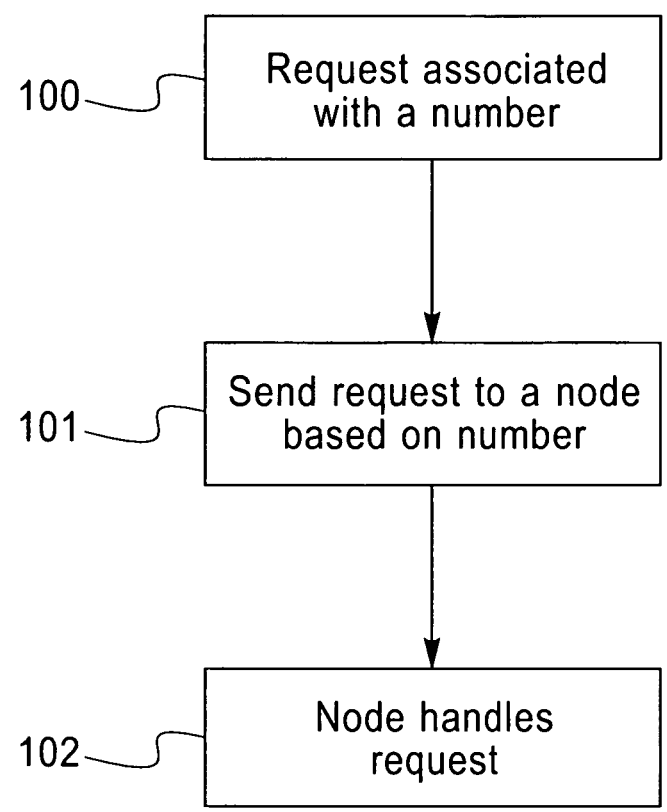
FIG. 10 is a flow diagram illustrating a method for routing requests to nodes, in accordance with an embodiment of the present invention.

FIG. 10 is a flow diagram illustrating such a method. In step 100, a number is associated with a request. The number could represent a price or something else. In step 101, the request is routed to a node based on its number. In step 102, the node handles the request. This step may optionally cause information to be stored on the node.

Figure 11:
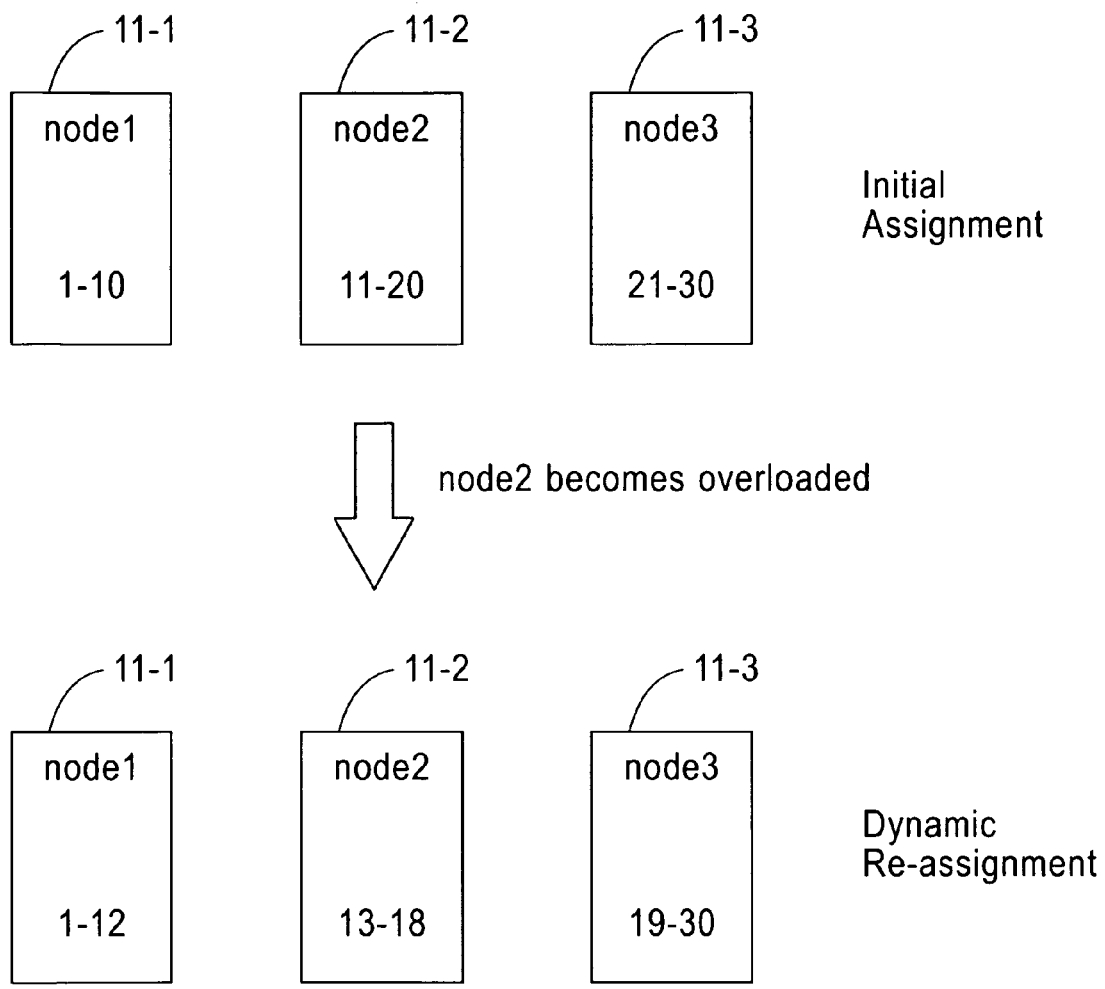
FIG. 11 is a block diagram illustrating an initial assignment and dynamic re-assignment of numbers to nodes, in accordance with an embodiment of the present invention.

FIG. 11 is a block diagram illustrating how numbers may be assigned to nodes. As shown, 11-1, 11-2, and 11-3 represent three nodes. Initially, numbers 1-10 are assigned to node 1 (11-1), numbers 11-20 are assigned to node 2 (11-2), and numbers 21-30 are assigned to node 3 (11-3). The initial assignment is preferably done in a manner which balances load across the nodes.

If node 2 becomes overloaded (and/or there is a change in workload), it may become desirable to reassign numbers to nodes. This re-assignment should preferably be done in a fashion which balances load across the nodes.

In FIG. 11, after node 2 (11-2) becomes overloaded, dynamic reassignment of numbers occurs so that fewer numbers are assigned to node 2 (11-2). In the new assignment, numbers 1-12 are assigned to node 1 (11-1), numbers 13-18 are assigned to node 2 (11-2), and numbers 19-30 are assigned to node 3 (11-3).

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for directing requests to at least one node in a system comprising multiple nodes and a plurality of requests, the method comprising the steps of:
assigning at least one price of a plurality of prices to each node of the multiple nodes so as to balance a load across the multiple nodes;
storing partitioned data structures to which the plurality of requests are related across the multiple nodes based on the at least one price assigned to each node of the multiple nodes;
sending at least one request of the plurality of requests to a given node of the multiple nodes based on a price associated with the request, wherein the at least one request is sent to the given node when the price associated with the request corresponds to the at least one price assigned to the given node; and
responsive to the system receiving a given number of requests associated with a given price range, associating a node with at least part of the given price range and assigning a given quantity of prices to the node to balance load;
wherein one or more of the assigning, storing and sending steps are performed in accordance with a computing system comprising a processor that loads one or more software components from a memory and executes the one or more software components so as to effectuate one or more of the assigning, storing and sending steps; and
wherein each node is assigned a range of prices.

2. The method of claim 1, further comprising the step of dynamically adjusting at least one price assigned to at least one node to improve a load balance across the nodes or to respond to a change in workload.

3. The method of claim 1, wherein each node is assigned a range of prices.

4. The method of claim 1, wherein each node is assigned prices congruent to a corresponding modulo value.

5. A method for storing information across nodes in a system comprising multiple nodes, the method comprising the steps of:
assigning different prices to different parts of the information;
storing the information across the nodes based on the assigned prices;
sending a request to one of the nodes based on a price associated with the request;
dynamically adjusting at least one price assigned to at least one node so as to improve a load balance across the nodes or to respond to a change in workload; and
responsive to the system receiving a given number of requests associated with a given price range, associating a node with at least part of the given price range and assigning a given quantity of prices to the node to balance load;
wherein one or more of the assigning and storing steps are performed in accordance with a computing system comprising a processor that loads one or more software components from a memory and executes the one or more software components so as to effectuate one or more of the assigning and storing steps.

6. The method of claim 5, further comprising the step of storing the information so as to balance a request load across the nodes.

7. A method for balancing load across nodes in a system comprising multiple nodes, the method comprising the steps of:
storing multiple data objects among the plurality of nodes;
in response to a node becoming overloaded, migrating at least one data object from the overloaded node to a second node;
maintaining an estimate of load associated with each data object; and
selecting the at least one data object to migrate based on the estimates of load associated with each data object;
wherein the estimate of load associated with each data object is correlated with a frequency with which transactions associated with a data object are received;
wherein one or more of the storing, migrating, maintaining and selecting steps are performed in accordance with a computing system comprising a processor that loads one or more software components from a memory and executes the one or more software components so as to effectuate one or more of the storing, migrating, maintaining and selecting steps;

wherein the estimate of load associated with each data object weights more recent transactions more heavily than less recent transactions.

8. The method of claim 7, wherein the estimate of load associated with each data object weights more recent transactions more heavily than less recent transactions.

9. A method for balancing load across nodes in a system comprising multiple nodes and multiple data objects, the method comprising the steps of:
maintaining an estimate of load associated with each data object;
using the estimates of load associated with each data object to store the data objects among the plurality of nodes so as to balance load among the nodes; and
in response to a node becoming overloaded, migrating at least one data object from the overloaded node to a second node;
wherein the estimate of load associated with each data object is correlated with a frequency with which transactions associated with a data object are received;
wherein one or more of the maintaining and using steps are performed in accordance with a computing system comprising a processor that loads one or more software components from a memory and executes the one or more software components so as to effectuate one or more of the maintaining and using steps; and
wherein the data objects are stored among the nodes so that sums of estimates of load for data objects stored on a particular node are similar across all nodes.

10. The method of claim 9, wherein at least one data object comprises at least one of: (i) a portion of an order book relating to one or more financial instruments; and (ii) a substantially whole order book relating to one or more financial instruments.

11. The method of claim 9, wherein the system comprises an electronic trading system.

12. The method of claim 9, wherein the maintaining step and the using step are implementable in accordance with a computer readable storage medium containing one or more programs which when executed implement said steps.

* * * * *